(12) United States Patent
Schroder et al.

(10) Patent No.: US 9,757,908 B2
(45) Date of Patent: Sep. 12, 2017

(54) FIXING DEVICE

(71) Applicant: Vestas Wind Systems A/S, Aarhus N. (DK)

(72) Inventors: Henning Schroder, Hvide Sande (DK); Leif Kappel Petersen, Lem St. (DK); Maja Rose Wieland, Arhus C (DK); Olav Davis, Hamble (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/067,685

(22) Filed: Mar. 11, 2016

(65) Prior Publication Data

US 2016/0214334 A1 Jul. 28, 2016

Related U.S. Application Data

(62) Division of application No. 12/902,467, filed on Oct. 12, 2010, now Pat. No. 9,283,715.

(Continued)

(30) Foreign Application Priority Data

Oct. 12, 2009 (EP) .................................. 09 172 777

(51) Int. Cl.
*B29C 70/54* (2006.01)
*B29C 33/50* (2006.01)
(Continued)

(52) U.S. Cl.
CPC .......... *B29C 70/541* (2013.01); *B29C 33/505* (2013.01); *B29C 70/44* (2013.01);
(Continued)

(58) Field of Classification Search
CPC ..... B29C 33/505; B29C 70/44; B29C 70/541; B29K 2105/0881; B29L 2031/085; B29L 2031/082; Y02E 10/721; Y02P 70/523
See application file for complete search history.

(56) References Cited

U.S. PATENT DOCUMENTS 5,041,182 A 8/1991 Sekiguchi et al.
6,264,877 B1 7/2001 Pallu De La Barriere
(Continued)

FOREIGN PATENT DOCUMENTS

| DK | 175863 B1 | 4/2005 |
|---|---|---|
| EP | 1695813 A1 | 8/2006 |
| WO | 2006082479 A1 | 8/2006 |

OTHER PUBLICATIONS

Monica Lozza; European Search Report issued in European priority application No. EP 09172777.6; Jun. 14, 2010; 5 pages; European Patent Office.

(Continued)

*Primary Examiner* — Vishal I Patel
(74) *Attorney, Agent, or Firm* — Wood Herron & Evans LLP

(57) ABSTRACT

A fixing device for fixating a segment of a wind turbine blade to a mold in which the blade segment is manufactured, wherein the blade segment has a fixating portion. The fixing device comprises: a first portion for removably fixating the blade segment at its fixating portion to the mold; and a second portion for fixating the fixing device to the mold.

13 Claims, 6 Drawing Sheets

Related U.S. Application Data

(60) Provisional application No. 61/252,206, filed on Oct. 16, 2009.

(51) Int. Cl.
  *B29C 70/44* (2006.01)
  *B29L 31/08* (2006.01)
  *B29K 105/08* (2006.01)

(52) U.S. Cl.
  CPC . *B29K 2105/0881* (2013.01); *B29L 2031/082* (2013.01); *B29L 2031/085* (2013.01); *Y02E 10/721* (2013.01); *Y02P 70/523* (2015.11)

(56) References Cited

U.S. PATENT DOCUMENTS

| | | | |
|---|---|---|---|
| 9,283,715 B2 | 3/2016 | Schroder et al. | |
| 2006/0017200 A1* | 1/2006 | Cundiff | B29C 70/44 |
| | | | 264/511 |

OTHER PUBLICATIONS

European Patent Office, Opposition issued in corresponding Danish Application No. 09172777.6, dated Sep. 5, 2014, 5 pages.
VI Patel, Examiner, U.S. Patent and Trademark Office, Notice of Allowance issued in U.S. Appl. No. 12/902,467, dated Nov. 5, 2015.
VI Patel, Examiner, U.S. Patent and Trademark Office, final Office Action issued in U.S. Appl. No. 12/902,467, dated May 4, 2015.
VI Patel, Examiner, U.S. Patent and Trademark Office, Office Action issued in U.S. Appl. No. 12/902,467, dated Sep. 26, 2014.

* cited by examiner

FIXING DEVICE

CROSS-REFERENCE TO RELATED APPLICATIONS

The present application is a divisional of pending U.S. patent application Ser. No. 12/902,467 filed Oct. 12, 2010, which claims priority under 35 U.S.C. §119(a) to European Application No. EP 09 172 777.6, filed Oct. 12, 2009. This application also claims the benefit of U.S. Provisional Application No. 61/252,206, filed Oct. 16, 2009. Each of the applications is incorporated by reference herein in its entirety.

TECHNICAL FIELD

The present invention relates to a fixing device, and, in particular, to a fixing device for fixating a wind turbine blade to a mold, a mold with a fixing device for manufacturing of a wind turbine blade, a method for manufacturing of a wind turbine blade, and a wind turbine with a blade.

BACKGROUND

Wind turbine blades known in the art are typically made of wood or a mold material, such as fiber-glass or carbon fibers. Such wind turbine blades are typically manufactured in halves. The blade halves are manufactured by molding each half of a blade in a respective mold (or mold half). The two molded blade halves are connected to each other by putting them on top of each other, while they are still in the respective molds. Thus, there is a risk that a blade half in the mold which is rotated to be put on top on the other mold could fall out of the rotated mold or could at least be displaced in the mold.

For example, from EP 1 695 813 B1 it is known to fixate a blade half in a mold by providing the blade half with a curved fixating portion which engages a respective protrusion on the mold.

Moreover, from U.S. Pat. No. 6,264,877 B1 it is known to manufacture a blade in two halves by forming each half with a composite material formed in a respective first and second mold. The first mold is designed to be shut down on the second mold. The composite material formed in the first mold is covered with a film and a suction is established between the inside wall of the first mold and the film, thereby holding the composite material and the film against the inside wall of the first mold. Moreover, an inflatable envelope or balloon is placed on the composite material of the second mold. When the first mold is closed down to the second mold, the envelope is inflated to keep the composite material placed inside the first and second molds.

Although the fixing of the blade half as known from EP 1 695 813 B1 may provide a satisfactory fixating of the blade half, aspects of the present invention provide improved fixating of a wind turbine blade to a mold during manufacturing of the same.

SUMMARY

According to a first aspect, the invention provides a fixing device for fixating a segment of a wind turbine blade to a mold in which the blade segment is manufactured, wherein the blade segment has a fixating portion. The fixing device comprises: a first portion for removably fixating the blade segment at its fixating portion to the mold; and a second portion for fixating the fixing device to the mold.

According to a second aspect, the invention provides a method for manufacturing a wind turbine blade or a segment of a wind turbine blade in a mold, comprising the steps of: manufacturing a blade segment in a mold, at least one fixating portion being at least partially formed at the blade segment; providing at least one fixing device according to the first aspect at the mold; and removably fixating the at least one fixating portion of the blade segment to the mold with the fixing device.

According to a third aspect, the invention provides a mold in which at least a segment of a wind turbine blade is manufactured. The mold comprises: a first portion for forming at least the segment of a wind turbine blade; a second portion at least partially surrounding the first portion for forming at least one fixating portion of the blade segment; and a fixing device according to the first aspect to fixate the at least one fixating portion of the blade segment the second portion of the mold.

According to a fourth aspect, the invention refers to using a fixing device according to the first aspect.

According to a fifth aspect, the invention provides a blade or a blade segment for a wind turbine manufactured by using at least one fixing device according to the first aspect and/or manufactured by using the method according to the second aspect.

According to a sixth aspect, the invention provides a wind turbine comprising at least one blade in accordance with the fifth aspect.

Further aspects of the invention are set forth in the dependent claims, the following description and the drawings.

BRIEF DESCRIPTION OF THE DRAWINGS

Embodiments of the present invention are explained by way of example with respect to the accompanying drawings, in which.

DETAILED DESCRIPTION

Figure 1:
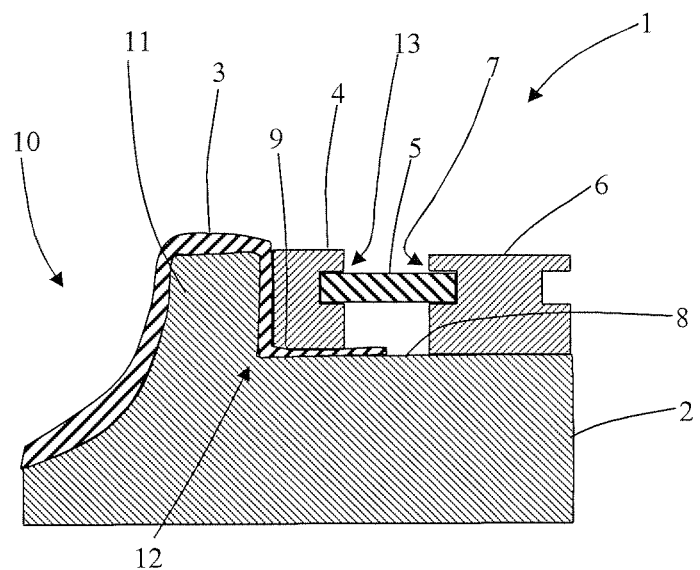
FIG. 1 schematically illustrates in a sectional view a mold with a fixing device in accordance with a first embodiment in which the fixing device comprises a wedge-like structure for fixing a fixating portion of a blade half to the mold.

FIG. 1 illustrates a first embodiment of a mold with a fixing device in which the fixing device comprises a wedge for clamping a fixating portion of a half of a wind turbine blade to the mold. Before a detailed description of the preferred embodiments, general explanations are made.

As mentioned in the outset, wind turbines blades known in the art are typically made of wood or a mold material, such as fiber-glass or carbon fibers. Such blades are typically manufactured in halves in a respective mold (half). A blade half in the following description refers to a half of a blade divided along the longitudinal direction of the blade, i.e. from the root end to the tip end, such that the blade is divided into a leeward blade half and a windward blade half. Thus, each blade half may have at least a part of a trailing edge and a leading edge of the blade.

Furthermore, in particular for long blades, such as 50 m or more, it is known to manufacture the blade in segments, i.e. the blade (or blade half) is divided into smaller blade segments along the longitudinal and/or width direction of the blade.

The blade segments, such as blade halves or blade half segments, are manufactured by molding each segment of a blade (or blade half segment) in a corresponding mold, e.g., by filling and/or laminating a mold material, such as carbon fibers or glass fibers or any other suitable material, in the mold and curing it. After the respective blade segments have been formed, for example, two molded blade segments are connected to each other by putting the molds in which the corresponding blade segments have been formed or molded on top of each other, while the formed blade segments are still in the molds and adhering them at the joint. For instance, one mold stays on the ground while the other mold is rotated together with the formed blade segment therein and the mold is put on top on the mold on the ground. Thus, there is a risk that a blade segment in the mold which is rotated to be put on the other mold might fall out of the mold or might at least be displaced.

Furthermore, for the manufacturing of blades in some embodiments a vacuum is used to hold the mold material laminated into the mold, tight to the mold by applying a low-pressure in the mold. The low-pressure in the mold with the mold material in it can be achieved, for example, with a vacuum bag made of a (plastic) foil or silicone. The mold together with the mold material is put into the vacuum bag and by exhausting the air out of the vacuum bag a low-pressure is generated in the vacuum bag such that the higher pressure of the ambient air presses the mold material onto the inner surface mold. Typically, the vacuum bag is removed before the respective molds with the blade segments therein are put on top of each other in order to expose the surface of the blade segments such that they can be connected to each other, for example, by adhering them together and, for example, to provide a spar or other structures in it or to fill it with a casting material or the like.

EP 1 695 813 B1, mentioned at the outset and incorporated herein by reference, pertains to the manufacturing of wind turbine blades by using a vacuum inside the mold. Blade halves are provided with a fixating portion, i.e., a portion of the blade shell which extends beyond the area of the mold which forms the blade. This fixating portion can have, for example, a rectangular shape for the blade half formed in the mold staying on the ground and a curved shape which engages a respective curved protrusion at the mold for the blade half in the second mold which is turned around.

Is has been recognized by the present inventors that such a measure, as disclosed in EP 1 695 813 B1, does not prevent the fall out of the molded blade half in all cases. Furthermore, the measure does not prevent displacement of the molded blade segment in the mold after switching off the vacuum, for example, after the laminated blade segment in the mold has been cured. The switch off of the vacuum is necessary in order to remove the vacuum bag before the blade segments (e.g., blade halves or blade half segments), are adhered together. However, when the vacuum is switched off there is a risk that the molded material (i.e., the formed blade segment, such as the leeward half), also referred to as "shell" in the following, in the mold may be displaced or pre-released. The pre-release might especially happen in the knuckle area on the blade's trailing edge (i.e., the edge which is opposite to leading edge of the blade, which is the edge showing in the moving direction of the rotor of the wind turbine). The pre-release and/or displacement of the molded blade segment might lead to problems, such as to properly put the two blade segments, for example, blade halves, on top on each other and to accurately adhere them together.

In the embodiments, a molded blade segment, which has been molded in the mold, is held in the mold with a fixing device. In some embodiments, the fixing device is configured to press and/or to clamp the formed/molded blade segment to the mold such that it is fixed in and/or on the mold. In other embodiments the fixing device is configured to fixate the blade segment to the mold by upholding a vacuum between the formed or molded blade segment and a mold surface after a vacuum bag has been removed.

In some embodiments, the blade segment is formed (molded) in the mold such that it has at least one fixating portion at least partially on at least one edge of the blade segment, for example, on the trailing edge or leading edge of a blade half or blade half segment. The fixating portion can extend beyond the part of the blade segment which is used for manufacturing the complete blade. Thus, the fixating portion extends beyond the portion of the blade segments which forms the blade shell. In some embodiments, the fixating portion is excessive and will be removed, for example, after the respective two blade halves have been connected to each other. In some embodiments, the fixating portion extends along the whole trailing and/or leading edge of the blade half or blade half segment. In other embodiments, the fixating portion extends only partially along the leading and/or trailing edge of the blade segment. In still other embodiments, multiple fixating portions extend partially adjacent to each other along the trailing and/or leading of the blade segment.

In some embodiments, the fixing device exerts a force, for example, a pressing or clamping force on the fixating portion of the blade segment in the direction to the mold, thereby fixating or clamping the fixating portion of the blade segment to the mold. In the embodiments, the fixing device can be configured to release the pressure or clamping force such that, for example, after the blade segment, such as blade halves, are put together and/or are connected to each other, the fixing device releases the pressing force and thereby releases the fixating portion of the blade segment and, thus, the blade segment itself.

In some embodiment, the fixing device comprises a first portion for removably fixating the fixating portion of a blade segment to the mold and a second portion for fixating the fixing device to the mold. The first portion or clamping portion of the fixing device, for example, abuts against the fixating portion such that the fixating portion is pressed against the mold and thereby clamped to the mold. The fixating portion holds at the mold due to the friction between the surface of the fixating portion of the blade and the surface of the mold and/or by providing a structure, for example, with a negative angle, on the mold surface in which the fixating portion can engage when it is pressed onto the structure by the first portion of the fixing device. In some embodiments, the fixing device can be configured to exert the pressing or clamping force between the first and second portions, for example, by clamping the fixing device between these portions and elongating it in a direction towards the first and/or second portion, thereby generating a pressing force acting on the first and/or second portion. The fixing device can also be supported at the second portion by the mold. The second portion of the fixing device abuts in some embodiments against a structure on the mold or the fixing device is connected to the mold at or in the second portion. The fixing device is fixated to the mold at the second portion, for example, by a friction force between the second portion of the fixing device and a part of a surface of the mold, a structure mounted on the mold, or similar, or by mounting the fixing device at the second portion to the mold surface or to a structure mounted at the mold. Thus, the second portion is able to counteract the pressing or clamping force which is exerted on the first portion and which is transferred to the second portion. The first and/or second portion of the fixing device is in some embodiments, for example, an abutment face or at least a part of an abutment face abutting against the fixating portion or against the mold or a structure on the mold, respectively. In some embodiments, the first and/or second portion is a structural part of the fixing device, such as a rod or clamping head or similar, which is formed to press against the fixating portion and against the mold or a structure on the mold, respectively, for fixating the fixing device to the mold. Moreover, in some embodiments, the first portion simultaneously serves to fixate the fixating portion of the blade to the mold and also to fixate the fixing device to the mold. For instance, a fixing device, which is clamped between two protrusions on the mold and in which the first portion of the fixing device abuts against a first protrusion and the second portion abuts against a second protrusion, is fixated by the clamping or pressing force exerted by the first and second portion on the first and second protrusion, respectively. In alternative embodiments, the fixing device is only fixated at the second portion to the mold, for example, by mounting it at the second portion to the mold.

In some embodiments, the fixing device can be at least partially inflatable and comprises, for example, an inflatable portion or structure in the first portion which is inflated to exert the pressing force on the fixating portion of the blade segment. Thus, in some embodiments an inflatable is used for fixating a blade segment to a mold during manufacturing of the blade segment in the mold. The inflatable part is made of, for example, an elastomer, such as silicone, or any other suitable material which is inflatable. In some embodiments, the fixing device is complete formed by an inflatable material, such as an elastomer or the like, as already mentioned. In such embodiments, the first portion fixating the fixating portion of the blade is, for example, formed by the portion of the inflatable abutting against the fixating portion of the blade. Similarly, the second portion is formed, for example, by the part of the inflatable abutting against a protrusion or any other structure which is fixed to the mold and against which the inflatable can abut. Thus, in such embodiments, the first and the second portion might not even formed until the inflatable is inflated between the fixating portion and the protrusion.

The fixing device can also be biased in some embodiments and comprises, for example, a biasing structure, with, for example, a gas piston, a spring or a mechanical and/or electromagnetic device, to exert the pressure or clamping force on the fixating portion of the blade segment. The biasing structure can be positioned, for example, between the first and second portion.

In some embodiments, the fixing device comprises a wedge like part which is clamped, for example, between a first protrusion on the mold over which the fixating portion of the blade segment extends and another second protrusion opposite to the first protrusion, thereby fixating, i.e., clamping, the fixating portion to the mold.

In some embodiments, the fixing device additionally comprises a mechanical lock for locking the fixing device in a predefined position, also referred to as working position, in which it exerts a pressing force on the fixating portion of the blade segment. The mechanical lock can further be releasable such that a user can release the fixing device and thereby release the fixating portion and, thus, the blade segment, when need, for example, when the blade segment is cured and securely adhered to the other blade segment. In some embodiments, the mechanical lock is released when a part of the fixing device abuts against another mold, such as when two molds are put on top on each other.

For manufacturing the wind turbine blade, a mold material is filled into at least one mold. In some embodiments, as also mentioned above, the blade is manufactured in blade segments. Thus, in some embodiments, each blade segment is manufactured in a corresponding mold. By filling and/or laminating the mold material into the mold, the blade segment is formed or molded in the mold and, furthermore, at least one fixating portion is at least partially formed at the blade segment, for example, outside the shell region, as described above. However, in some embodiments a blade segment is placed, which has been molded in a different mold. Thus, in some embodiments the mold serves only as fixing unit for receiving and fixing a blade segment.

At least one of the above described fixing devices is provided at the mold. The fixing device can be positioned in a region adjacent to a portion of the mold which forms a shell portion of the blade segment, i.e. the portion of the blade segment which builds the blade shell, and in which the fixation portion extends. The blade segment is removably fixed with the at least one fixing device to the mold at the at least one fixating portion of the blade segment. In some embodiments, multiple fixing devices are used for fixating or clamping the blade segment to the mold.

As mentioned above, during the manufacturing of a blade segment a vacuum bag is provided in some embodiments on the mold after a mold material has been filled into the mold or a blade segment has been placed in the mold such that it covers the blade segment with the at least one fixating portion of the blade segment. In order to fixate the vacuum bag and to provide an airproof space in the vacuum bag, a first adhesive tape, such as a tacky tape, is provided between the vacuum bag and the at least one fixating portion of the blade segment. A second adhesive tape is provided between the vacuum bag and the mold adjacent to the fixating portion of the blade segment. The end of the fixating portion is positioned between the first and second adhesive tape. The air in the space between the mold and the vacuum bag is exhausted, for example, by an air-pump connected to the vacuum bag. Thus, the molding material, i.e. the formed blade segment is positioned in the vacuum bag and the vacuum bag provides an airproofed space around the formed blade segment. A low-pressure is generated in the vacuum bag by exhausting the air out of the vacuum bag. Thus, a pressure force fixates or clamps the blade segment on the surface of the mold. The pressure force results from the pressure difference between the ambient air which is under atmospheric pressure and the low-pressure in the vacuum bag. After the shell curing, for example, infusing curing, of the mold material in the mold is completed the vacuum bag is removed such that a portion of the vacuum bag remains between the first adhesive tape and the second adhesive tape covering the edge of the fixating portion of the blade segment. Thus, a strip of vacuum bag surrounds the fixating portion of the blade segment and, therefore, the vacuum remains intact, even though the vacuum bag is partially removed. Hence, the resulting pressure force also fixates the blade shell to the mold when the vacuum bag is removed, as long as the vacuum between the blade shell and the mold is intact, which is sealed by the surrounding remaining vacuum bag and the adhesive tapes. Furthermore, the strip of vacuum bag with the adhesive tapes also adheres the blade shell to the mold and enhances the fixing of the blade shell.

As mentioned above, the complete blade is manufacture by connecting, for example, the cured blade segments to each other by rotating a respective mold and putting it on top on another corresponding mold.

A mold for manufacturing at least a part of a wind turbine blade, such as a blade segment (e.g., a blade half), for placing a blade segment in it, comprises in some embodiments at least a first portion for forming at least a part of a segment of a wind turbine blade or for receiving a blade segment. The first portion is configured to form (or to receive) the part of the blade segment which will form the blade shell. The mold further comprises a second portion at least partially surrounding the first portion for forming or receiving at least one fixating portion of the wind turbine blade segment, as described above. In some embodiments the second portion is outside the region of and adjacent to the part of the mold which forms the blade shell. The second portion can have any suitable shape which allows the forming of the fixating portion, and may be angled, curved, flat, etc. The mold additionally comprises a fixing device, as described above, to fixate or clamp the fixating portion of the blade to the second portion of the mold.

In some embodiments, the mold further comprises a first protrusion which is positioned in the second portion of the mold. The protrusion can also limit the part of the mold which forms the blade shell. In such embodiments, the mold also comprises at least one second protrusion. In some embodiments, multiple second protrusions are provided on the mold, which can also have an additional task, such as spigots which also serve as connection point at which, for example, a crane, can be connected for rotating the mold to put it on another mold. In such embodiments, the at least one fixating portion of the blade and the fixing device can be positioned between the first and the at least one second protrusion.

The fixing device can be clamped between the first and/or second protrusion, and as described above, by elongating the fixing device in the direction towards the first and/or second protrusion, a generated pressing force acting on the first and/or second protrusion, thereby fixating or clamping the fixating portion of the blade segment to the mold.

In such embodiments, the second protrusion may comprise a groove. A portion of the fixing device, for example, the second portion of the fixing device, as explained above, may engage in the groove and thereby support the fixing device. Furthermore, the region of the mold between the first protrusion and the second protrusion may be basically flat, such that the fixing device, which is, for example, inflatable and/or comprises a basically flat portion or structure, such as a prop, can be easily positioned between the first and second protrusion.

In some embodiments, the fixing device is removably connected to the mold. Thus, the at least one fixing device can be easily removed, for example, after the blade halves have been connected to each other, such that the fixing devices does not obstruct workers who work on the blade to be manufactured. In some embodiments, multiple fixing devices are positioned around the blade segment, in order to securely fixate the blade segment to be manufactured to the mold.

A blade for a wind turbine can be manufactured by using a fixing device, a mold and a method for manufacturing the blade, as described above. As already mentioned, a blade is typically manufactured by connecting at least two blade segments, such as blade halves, to each other. The blade halves are still in their respective mold halves when they are connected to each other. One mold is rotated such that it can be put on top of the other mold. At least for the mold which is rotated, at least one fixing device, as described above, is used to fixate or clamp the blade half to the mold being rotated.

A wind turbine equipped with at least one blade described herein typically has a blade rotor, a nacelle and a tower.

FIG. 1 (First Embodiment)

Returning to the sectional view in FIG. 1, a fixing device 1 fixates a fixating flange 9 of a blade half 10 to a mold 2. The fixing device 1 has as plywood wedge 5 which is positioned and clamped, respectively, between a steel clamp 4 abutting against a protrusion 11 of the mold 2 and a spigot locater 6. Hence, in a first portion of the fixing device 1, the steel clamp 4 abuts with a surface facing to the protrusion 11 against protrusion 11 and in a second portion of the fixing device 1 the plywood wedge 5 abuts against spigot locator 6.

The steel clamp 4 has a groove 13 which is in a similar height as an annular groove 7 of spigot locater 6, which is fixed to mold 2, into which the plywood wedge 5 engages. The steel clamp 4 is not fixed to mold 2, but it is a separate part, and can be easily removed. The steel clamp 4 has a tapered shape in its longitudinal direction which extends into the paper sheet plane of FIG. 1. Moreover, steel clamp 4 is longer than wide; the width of steel clamp 4 extending to the left and right in FIG. 1. Due the tapered shape of steel clamp 4, the plywood wedge 5, which has a rectangular shape, clamps securely in the groove 13 of steel clamp 4 and groove 7 of spigot locate 6, when it is beat, for example, with a hammer, into grooves 13 and 7. Thus, steel clamp 4 exerts a pressing force against the fixating flange 9 (and spigot 6) and thereby fixates the fixating flange 9 and the blade half 10 to the mold 2.

The annular groove 7 of spigot locater 6 surrounds the spigot locater 6 and it can be used for providing different gap spacing, for example, for a tighter or looser fit of the plywood wedge 5, by mounting the spigot locater 6 in a rotated position. The spigot locater 6 is screwed to the mold 2 and, thus, cannot easily be removed but stays on mold 2 also after the mold 2 has been rotated and put on top of another mold (not shown).

The blade half 10 extends from a round-shaped portion of the mold 2 over the protrusion 11 which is integrally formed perpendicularly in mold 2 and ends in a fixating flange 9 which is positioned between steel clamp 4 and spigot locater 6. On top of the protrusion 11, the blade half has as connection surface 3 for connecting the blade half to a corresponding other blade half for connecting the two blade halves to each other. The fixating flange 9 extends along a vertical part of protrusion 9 and further along a horizontal flat plane 8 of mold 2. The flat plane 8 extends between protrusion 9 and spigot locater 6. The fixating flange 9 is clamped between the vertical surface of protrusion 11 facing to the steel clamp 4 and a surface of steel clamp 4.

In this embodiment, a transition 12 between protrusion 11 and the mold surface 8 has an angle of about 90°. Thus, the fixating flange 9 is basically held by the friction force between the fixating flange 9 and the protrusion 11. The friction force is generated by the plywood wedge 5 pressing against the steel clamp 4 and against the fixating flange 9. However, in other embodiments, the transition 12 between the protrusion 11 and the flat portion 8 of the mold 2 can be different from about 90°, but it can have a negative angle or re-entrant angle (such as the curved edge 22, shown in FIG. 2). In embodiments, in which the mold has a portion with a curved edge having a re-entrant angle, the fixating flange of the blade is (additionally) held mechanically by clamping the fixating flange with the fixing device into the re-entrant angle portion of the mold, thereby providing a kind of form fit.

The protrusion 11 surrounds the whole mold 2 such as the fixating flange 9 does. For fixating the blade half 10 in the mold 2, a plurality of fixing devices 1 is used and, thus, the mold 2 is equipped with a respective plurality of spigot locators 6.

As the steel clamp 4 and the plywood wedge 5 are separate parts, they can easily be removed when they are not needed.

During manufacturing of the blade half 10, a first a mold material, such as carbon fibers or the like, is laminated into the mold 2 forming blade half 10 with the contact surface 3 and the fixating flange 9. Then a vacuum bag is put around the mold 10 or at least put on the surface of blade half 10, such that it extends over the fixating flange 9, to provide a sealed space surrounding the blade half 10. Then, an air-pump (not shown) exhausts air from the space and a low-pressure is generated in the space, thereby pressing the blade half 10 onto the surface of mold 2 due to the higher atmospheric pressure of the ambient air. The blade half 10 is cured by infusion cure.

At next, a plurality of steel clamps 4 are put in a respective position opposite to a plurality of spigot locators 6 and plywood wedges 5 are beat with a rubber mallet into the grooves 13, 7 of the steel clamps 4 and spigot locators 6, as described above. When all plywood wedges 5 are fixed, the vacuum can be turned off, since now the fixing devices 1 fixates or clamps the blade half 10 in the mold 2, as described above. Then, the vacuum bag is removed. To remove the vacuum bag also under the steel clamp 4 and plywood wedge 5, these parts are temporarily removed. After the vacuum bag has removed in the region of the fixing device 1, the fixing device 1 is repositioned again to fixate the blade half 10. These steps are repeated until the vacuum bag has been completely removed. Then, the mold 2 with the blade half 10 can be turned around in order to connect the blade half 10 with another blade half by adhering them at connection surface 3 together.

Figure 2:
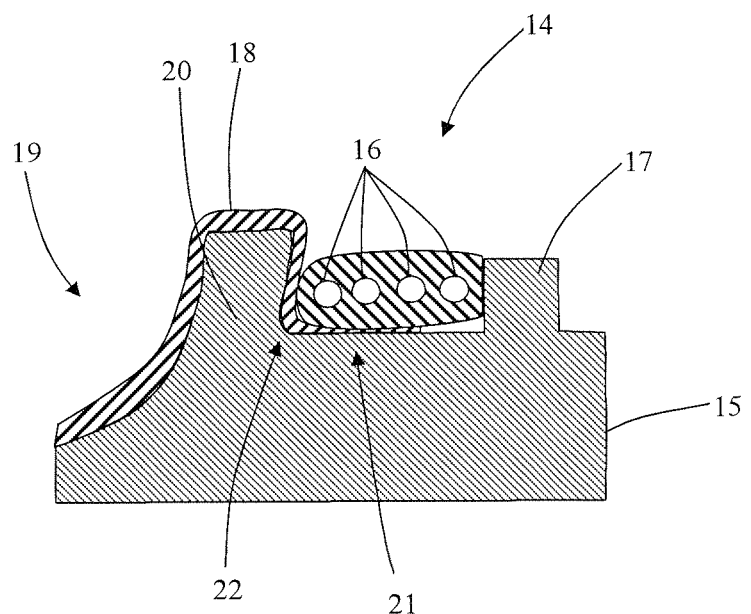
FIG. 2 schematically illustrates in a sectional view a mold with a fixing device in accordance with a second embodiment in which the fixing device comprises an inflatable structure for fixing a fixating portion of a blade half to the mold.

FIG. 2 (Second Embodiment)

In the alternative embodiment of a fixing device 14 of FIG. 2, the fixing device 14 is made of an inflatable polymeric, such as silicone rubber, which is robust, cost effective and almost "self-cleaning", since adhesive, which is used, for example, for adhering the blade halves together, does almost not glue on the silicone rubber. Moreover, it withstands the temperatures occurring during manufacturing of the blade half and during connecting respective mold halves together. In other embodiments other elastomeric materials may be used which are inflatable. The fixing device 14 has several air channels 16 in it, through which a fluid, such as pressure air can be conducted. The inflatable fixing device 14 is positioned between a first protrusion 18 and a second protrusion 17 of a mold 15. The inflatable fixing device 14 is formed to basically increase in its width direction, when it is filled, for example, with pressurized air. Thus, when it is inflated, it exerts a force in a first portion against protrusion 18 and in a second portion against protrusion 17 and thereby clamps a fixating flange 21 of blade half 19 to protrusion 18 and the fixing device to the mold 15.

The blade half 19 extends similarly to the first embodiment beyond the protrusion 18, building a connection surface 20 on top of protrusion 18. The connection surface 20 is positioned on a respective surface of another blade half (not shown) as also described in connection with the first embodiment.

Both protrusions 17, 18 are integral formed in mold 15. However, in some embodiments, instead of protrusion 17 also any other structure capable to support the fixing device, such as spigot locater 6, as described in connection with the first embodiment, may be used as a support structure for inflatable fixing device 14.

On the transition of the protrusion 18 to a flat area between the protrusion 18 and protrusion 17, a curved edge 22 is formed. The curved edge 22 allows the fixating flange 21 to smoothly extend along the protrusion 18 and the flat area. Furthermore, the rounded edge of inflatable fixing device 14 can smoothly engage in the rounded edge of fixating flange 21, enhancing the fixating of the fixating portion 21.

If needed, for example, after finishing the connection of two blade halves, the inflatable fixing device 14 can easily be completely removed by just exhausting the pressurized air out of the inflatable fixing device 14. When the air has been exhausted the width of fixing device 14 decreases such that it can be removed or falls automatically out of the area between protrusions 17 and 18 and downwards due to gravitation force, in the case the mold 15 is positioned upside down, for example, on another mold.

Other issues described in context of FIG. 1, but not mentioned here, also apply to the embodiment of FIG. 2, if so appropriate.

Figure 3:
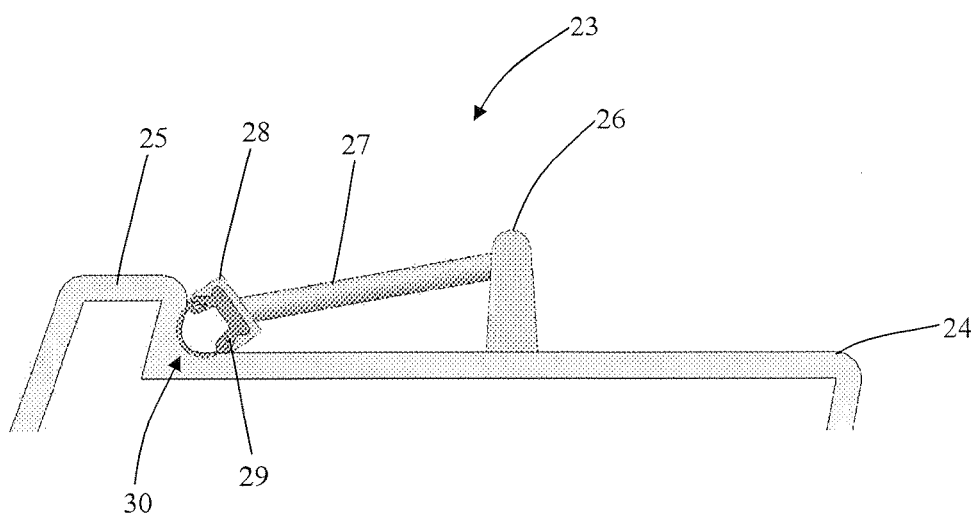
FIG. 3 schematically illustrates a mold with a fixing device in accordance with a third embodiment in which the fixing device comprises an inflatable structure hinged to the mold for fixing a fixating portion of a blade half to the mold.

FIG. 3 (Third Embodiment)

The alternative embodiment of a fixing device 23 in FIG. 3 exerts the pressing force with an inflatable portion 29 onto a fixating flange of a blade half positioned on a mold 24 (not shown for simplification reasons). The inflatable portion 29, which is formed as flexible tube made of silicone, or any other suitable elastomer, is positioned in a holder 28 which is hinged to a bar 27. The bar 27 is hinged to a support 26 which is connected in respective portion of the support 26 to the mold 24, for example, by screwing. In the working position shown in FIG. 3, the inflatable portion 29 is filled with pressurized air and, thus, fixing device 23 exerts a pressing force with the inflatable portion 29 on a protrusion 25 integrally formed on mold 24.

A curved edge 30 is formed on protrusion 25 which is adapted to the curvature of inflatable portion 29 such that the inflatable portion 29 smoothly engages into the curved edge 30.

The distance of support 26 to protrusion 25 and the dimensions of the bar 27 with the holder 28 and the inflatable portion 29 are such formed that the bar 27 together with the holder 28 and the inflatable portion 29 can be turned around the hinge on support 26, when the pressurized air is exhausted out of the inflatable portion 29. When the pressurized air (or any other fluid) is exhausted out of the inflatable portion 29 the inflatable portion 29 becomes smaller in its extension and thereby releases the fixing device 23. Thus, when the pressing force of fixing device 23 is not needed, the pressurized air can be exhausted and by turning around the bar 27, as described, the fixing device 27 does not obstruct a worker working the blade.

Other issues described in context of other figures, but not mentioned here, also apply to the embodiment of FIG. 3, if so appropriate.

Figure 4:
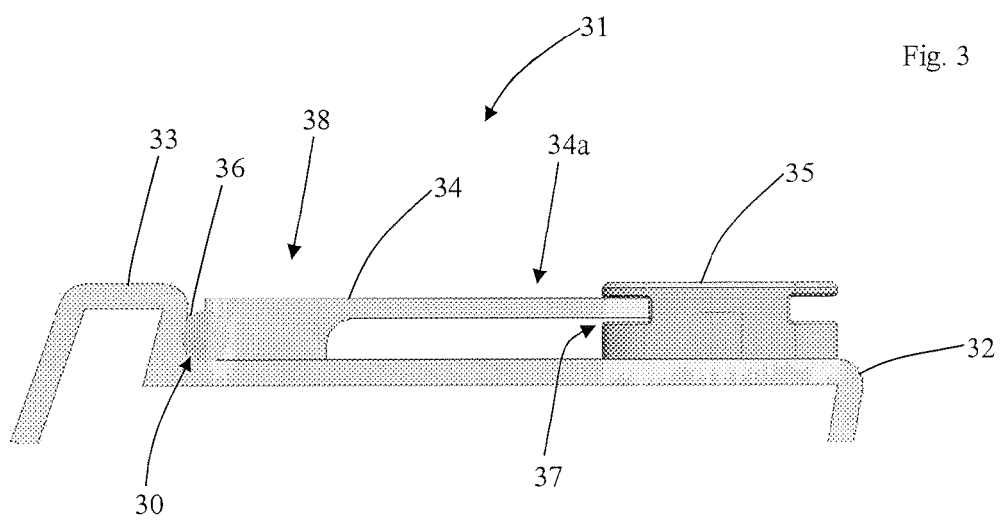
FIG. 4 schematically illustrates a mold with a fixing device in accordance with a fourth embodiment in which the fixing device comprises an inflatable structure and a prop for fixing a fixating portion of a blade half to the mold.

FIG. 4 (Fourth Embodiment)

A further alternative embodiment of a fixing device 31 in FIG. 4 has an inflatable portion 36 which is positioned in a round cavity of a prop 34 adapted to the inflatable portion 36. Prop 34 of fixing device 31 is positioned between a protrusion 33 of a mold 32 and a spigot 35 which is screwed to the mold 32. Prop 34 has a thin elongated portion 34a which engages into a groove 37 of spigot 35 and a thick portion 38 such that the prop 34 has contact with a flat portion of the mold 32 extending between the protrusion 33 and the spigot 35. The prop 34 is basically rectangular shaped.

The prop 34 is clamped between the inflatable portion 36 and the spigot 35 when the inflatable portion 36 is inflated with, for example, pressurized air, and the inflatable portion 36 exerts a pressing force on protrusion 33 and a fixating flange of the blade half (not shown for simplification reasons). Simultaneously, an end portion of the elongated portion 34a abutting against a side wall of the groove 37 of spigot 35 exerts a pressing force on spigot 35, thereby fixating the fixing device to spigot 35 and to the mold 32. The inflatable portion 36 is made of an elastomer, e.g., silicone, and formed as a tube extending, for example, along the protrusion 33.

Similarly as described in connection with the third embodiment, protrusion 33 also has a curved edge which is adapted to inflatable portion 36.

When the pressurized air is exhausted out of the inflatable portion 36 the pressing force exerted on the protrusion 36 is released and the prop 34 can be easily removed by moving it out of groove 37.

Other issues described in context of other figures, but not mentioned here, also apply to the embodiment of FIG. 4, if so appropriate.

Figure 5:
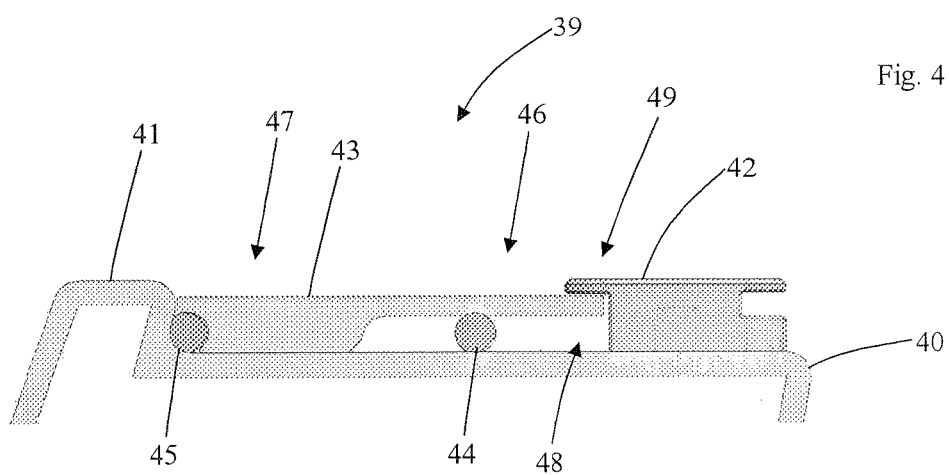
FIG. 5 schematically illustrates a mold with a fixing device in accordance with a fifth embodiment in which the fixing device comprises two inflatable structures and a prop for fixing a fixating portion of a blade half to the mold.

FIG. 5 (Fifth Embodiment)

The embodiment of a fixing device 39 illustrated in FIG. 5 is similar to the fourth embodiment of FIG. 4. The fixing device 39 comprises two inflatable tubes 45 and 44 made of an elastomer, e.g., silicone. The first inflatable tube 45 is positioned similarly as inflatable tube 36 of the fourth embodiment between a protrusion 41 of a mold 40 and a curved portion of a prop 43 of the fixing device 39. The second inflatable tube 44 is positioned underneath a thin elongated portion 46 of a rectangular shaped prop 43 for supporting prop 43. An upper surface of prop 43 abuts upon a lower surface of a spigot 42 screwed to a mold 40. The spigot 42 does not have a groove 37 as spigot 35 of the fourth embodiment, but there is a cut-away 48 instead. The cut-away 48 is limited by a portion 49 of the spigot 42 extending above the cut-away 48.

Thus, when the inflatable tubes 45 and 44 are inflated the prop 43 moves upwards and a portion of prop 43 abuts against the lower surface of portion 49 and a side wall of spigot 42, thereby fixating the fixing device to spigot 42 and thereby to the mold 40. Then, the inflatable tube 45 positioned at an edge of a thicker portion 47 of the prop 43 exerts a pressing force against the protrusion 41 integrally formed in mold 40. Also prop 43, as well as protrusion 41, have rounded edges such that the circular shaped tube 45 can smoothly be housed in the space formed by the round edge of protrusion 41 and the rounded cavity of prop 43.

When the inflatable tubes 45 and 44 are inflated, a pressing force is also exerted by a portion of inflatable tube 45 on the protrusion 41 such that a fixating flange of a blade half (not shown for simplification reasons) can be securely fixed or clamped between protrusion 41 and inflatable tube 45.

When the fixing device 39 is not needed anymore, the pressurized air is exhausted from the inflatable tubes 45 and 44, thereby releasing the pressing force and also releasing prop 46 which can easily be removed. The prop 46 can easily be removed and may automatically fall down when the pressurized air is exhausted from the inflatable tubes 44 and 45, since there is, in contrast to the fourth embodiment, no groove present in the spigot 42, but only the cut-away 48 which provides enough space for moving prop 46.

Other issues described in context of other figures, but not mentioned here, also apply to the embodiment of FIG. 5, if so appropriate.

Figure 6:
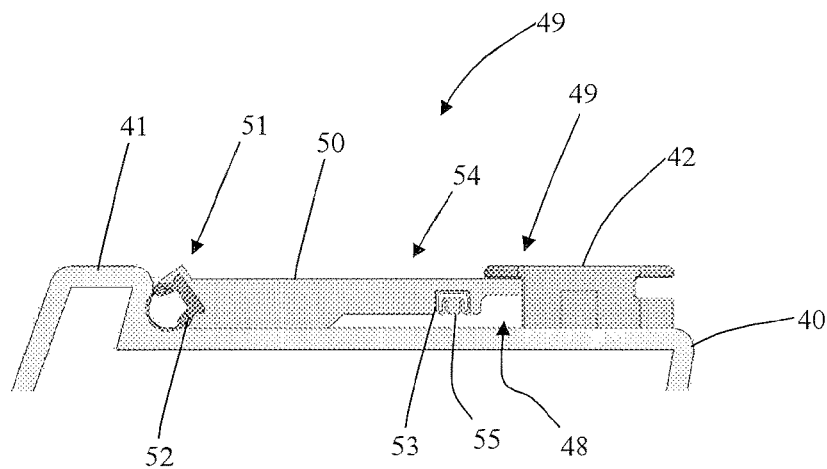
FIG. 6 schematically illustrates a mold with a fixing device in accordance with a sixth embodiment in which the fixing device comprises an inflatable structure and a prop for fixing a fixating portion of a blade half to the mold.

FIG. 6 (Sixth Embodiment)

In a further alternative embodiment of a fixing device 49, illustrated in FIG. 6, a prop 50 has a thick portion 51 into which a holder for an inflatable tube 52 is integrally formed and a thinner portion 54 into which an inflatable support 53 is integrated.

The fixing device 49 is positioned between the spigot 42 with the cut-away area 48 and the protrusion 41 on the mold 40, which have already been described in connection with the fifth embodiment (FIG. 5).

When the inflatable support 53 is inflated a foot portion 55 is pushed downwards and abuts onto a flat portion of mold 40 between the spigot 42 and the protrusion 41, thereby pressing the prop 50 upwardly against the lower surface of extended portion 49 of the spigot 42 and fixating it to spigot 42. Inflating the inflatable tube 52 results in a pressing force exerted by a portion of the inflatable tube 52 on protrusion 41 and, thus, as also described above, it fixates or clamps a fixating flange of a blade half to the mold 40 (which are not shown for simplification reasons).

When inflatable tube 52 and inflatable support 52 are deflated, the pressing force and, thus, the prop 50 is released and the prop 50 can easily be removed or falls automatically downwards, when the mold 40 is turned upside down, as also described above.

Other issues described in context of other figures, but not mentioned here, also apply to the embodiment of FIG. 6, if so appropriate.

Figure 7:
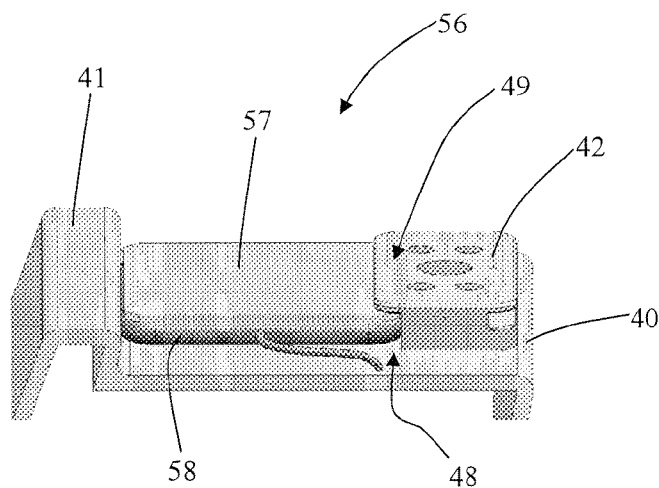
FIG. 7 schematically illustrates a mold with a fixing device in accordance with a seventh embodiment in which the fixing device comprises an inflatable pillow and a prop for fixing a fixating portion of a blade half to the mold.

FIG. 7 (Seventh Embodiment)

The further alternative embodiment of a fixing device 56 illustrated in FIG. 7 is equipped with an inflatable pillow 58 which is adhered to a plate 57. The inflatable pillow 57 together with the plate 57 engages into the cut-away area 48 of spigot 42 mounted on mold 40, which have already been described above in connection with FIGS. 5 and 6 and the fifth and sixth embodiment.

When the inflatable pillow 58 is inflated it increases its height and presses the plate 57 onto the lower surface of the extending portion 48 of spigot 42, thereby fixating it to mold 30. Furthermore, it also increases in its length direction and, thus, a portion of the inflatable pillow 58 abuts against protrusion 41 of mold 40 and against spigot 42 and, thereby, exerts a pressing force onto protrusion 41 fixating or clamping a fixating portion of blade half (not shown for simplification reasons) to the mold 40.

When the inflatable pillow 58 is deflated, the plate 57 together with the pillow 58 can easily be removed.

Other issues described in context of other figures, but not mentioned here, also apply to the embodiment of FIG. 7, if so appropriate.

Figure 8:
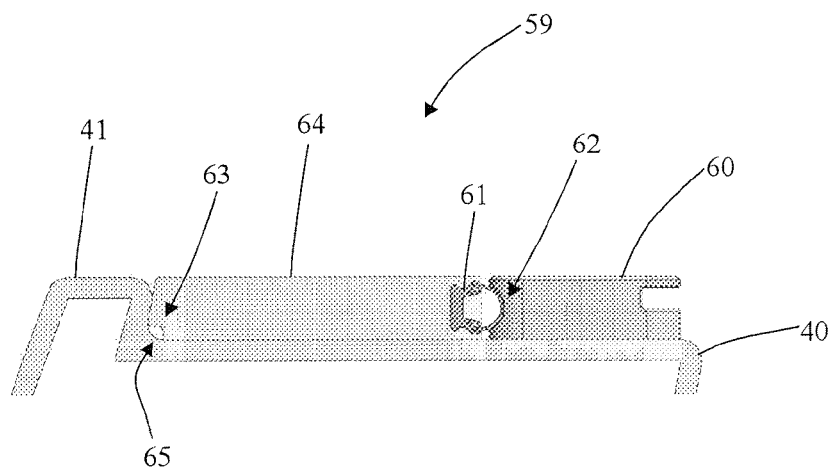
FIG. 8 schematically illustrates a mold with a fixing device in accordance with an eighth embodiment in which the fixing device comprises an inflatable structure and a prop for fixing a fixating portion of a blade half to the mold.

FIG. 8 (Eighth Embodiment)

The alternative embodiment of a fixing device 59, illustrated in FIG. 8, is equipped with a plate-like member 64 in which an inflatable tube 61 is integrally formed. Further the plate-like member 64 has basically the same height as a spigot 60 mounted on a mold 40. The plate-like member 64 further has a portion 63 which is adapted to a curved edge portion 65 of protrusion 41, which is integrally formed on mold 40.

The spigot 60 has a round shaped cavity 62 which is adapted to the circular shape of the inflatable tube 61 such that the inflatable tube 61 can smoothly engage into the cavity 62 when it is inflated and thereby fixates the fixing device 59 to spigot 60, and, thus, also to mold 40.

By inflating the inflatable tube 61 it abuts against the cavity 62 of spigot 60 and pushes thereby the plate-like member 61 with its portion 63 against protrusion 41 and the curved edge portion 65 and exerts a pressing force on them. Hence, a fixating portion of a blade half (not shown for simplification reasons) positioned between protrusion 41 and fixing device 59 is fixed or clamped to the mold 40.

When the inflatable tube 61 is deflated, the pressing force is released and the plate-like member 64 can easily be removed.

Other issues described in context of other figures, but not mentioned here, also apply to the embodiment of FIG. 8, if so appropriate.

Figure 9:
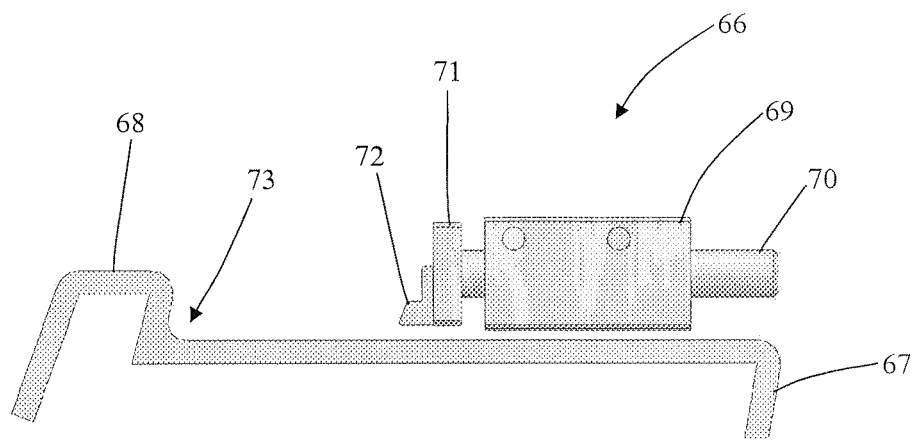
FIG. 9 schematically illustrates a mold with a fixing device in accordance with a ninth embodiment in which the fixing device comprises a piston for fixing a fixating portion of a blade half to the mold.

FIG. 9 (Ninth Embodiment)

The further embodiment of a fixing device 66, as illustrated in FIG. 9, is equipped with a gas-piston 66 mounted with a main body 69 in a mounting portion to a mold 67.

A piston 70 extending through the main body 69 has a clamping head 71 mounted on the end of the piston 70 facing a protrusion 68 integrally formed on mold 67.

The clamping head 71 has an abutting surface 72 which is formed to engage into a corner portion 73 at the transition of the protrusion 68 to a flat area of mold 67.

Thus, when the gas piston is actuated, the abutting surface 72 is pressed against the protrusion 68 thereby exerting a pressing force onto protrusion 68 and fixating or clamping a fixating portion of a blade half (not shown for simplification reasons) to the mold 67.

In alternative embodiments the clamping head 71 is hinged to the piston 70 and/or the piston 70 is moved in an angle relative to the mold 67 such that it points down to mold 67, for example, in the direction of corner 73 to enhance the fixating or clamping of the fixating portion of the blade half.

When the fixing device 66 is not needed, piston 70 is moved back into the idle position illustrated in FIG. 9 and thereby the blade half is released.

In further alternative embodiments, the clamping head 71 can be extended by using a mechanical gear or an electromagnetic device, such as an electric motor or the like. In principle, any other mechanical, electrical or combination of mechanical and electrical device can be used, which is adapted to extend the clamping head 71 and to exert a pressure force on the fixating flange of the mold.

Other issues described in context of other figures, but not mentioned here, also apply to the embodiment of FIG. 9, if so appropriate.

Figure 10:
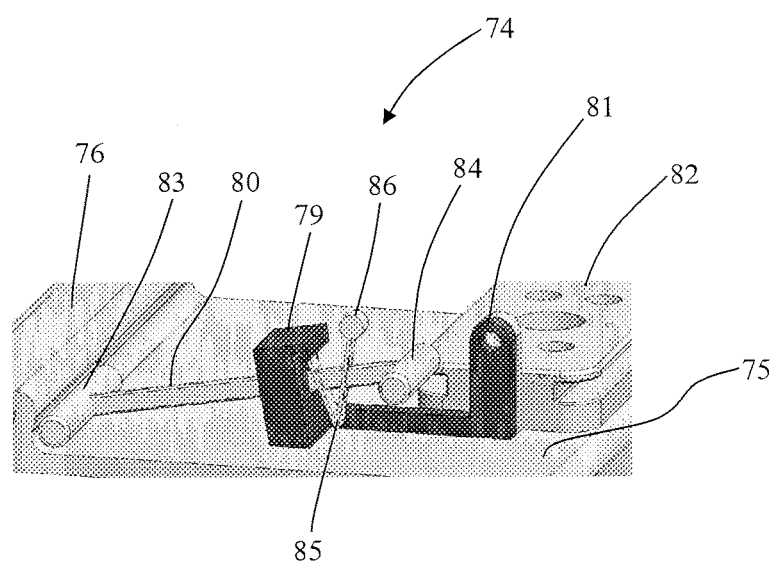
FIG. 10 schematically illustrates a mold with a fixing device in accordance with a tenth embodiment in which the fixing device comprises a mechanical lock for fixing a fixating portion of a blade half to the mold.
Figure 11:
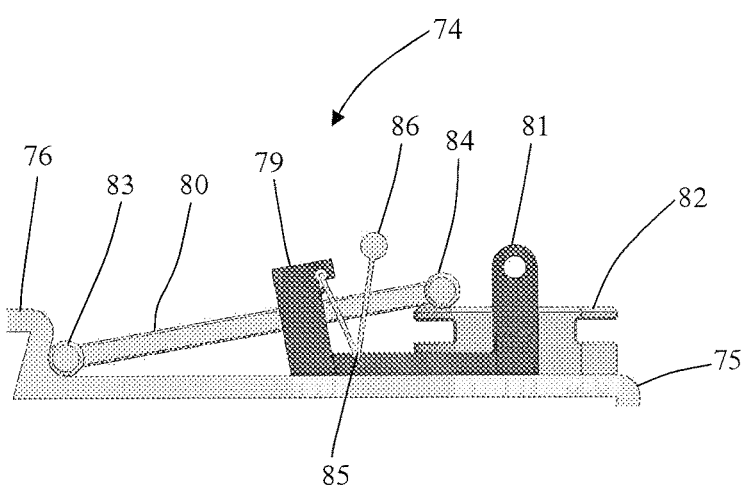
FIG. 11 shows another side view of the mold with the fixing device illustrated in FIG. 10.
Figure 12:
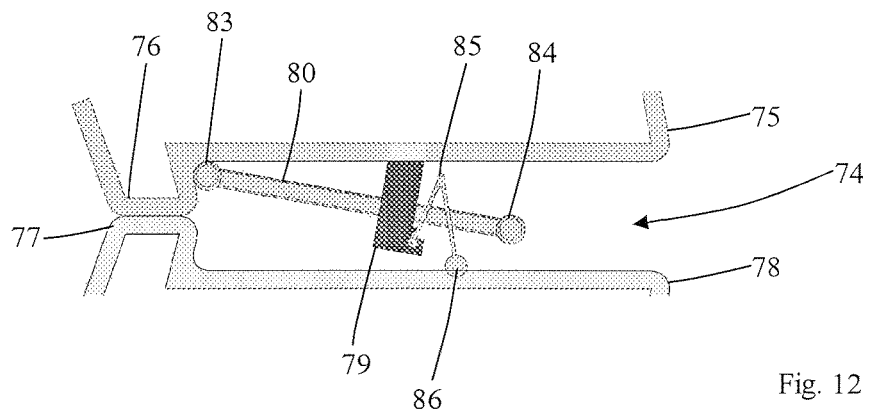
FIG. 12 shows a three-dimensional view of the mold with the fixing device illustrated in FIGS. 10 and 11.

FIGS. 10 to 12 (Tenth Embodiment)

The further embodiment of a fixing device 74, illustrated in FIGS. 10 to 12, is equipped with a mechanical mechanism for exerting a pressing force on a protrusion 76 of a mold 75.

The fixing device 74 is mounted with a support 79 at a mounting portion 81 to a spigot 82, which in turn is mounted to the mold 75. In alternative embodiments, the fixing device 74 is directly mounted to the mold 75.

The fixing device 74 has a bar 80 with a pressing rod 83 mounted at the end facing the protrusion 76 and a handle bar 84 mounted at the opposite end of the bar 80. The bar 80 extends through the support 79 which has a respective opening adapted to the bar 80. A clamping mechanism 85 is hinged to the support 79 which is capable to lock the bar 80 at a defined position. The clamping mechanism 85 has two openings through which the bar 80 extends. The openings are adapted to the shape of the bar. Furthermore the clamping mechanism 85 is hinged at the support 79 and biased with a spring such that the clamping mechanism 85 is forced upwards, thereby clamping the bar 80 in the openings. When a personnel pushes on a handle bar 86 of the clamping mechanism 85, the clamping mechanism 85 is urged downwards in the direction to the mold 75, thereby releasing the bar 80 in the openings of the clamping mechanism 85.

Thus, for fixating or clamping a fixating flange of a blade half (not shown for simplification reasons) to the protrusion 76 of the mold 75, a personnel takes the handle bar 84 and pushes the bar 80 in the direction of the protrusion 76 thereby exerting a pressing force on the protrusion 76 and the fixating flange lying of a blade half (not shown for simplification reasons) between the protrusion 76 and the pressing bar 83. In this position, the bar 80 is locked with clamping mechanism 85, thereby the pressing rod 83 exerting a pressing force on the fixating flange of the blade half.

The handle bar 86 of the clamping mechanism 85 has a distance to the surface of mold 75 such that it abuts against a second mold 78 (FIG. 12) when the mold 75 is positioned upside down on the second mold 78. Thus, when positioning the mold 75 with the protrusion 76 on the second mold 78 with protrusion 77 on top of another, the handle bar 86 is (automatically) actuated such that the bar 80, i.e., the fixing device 74, is automatically released and the bar 80 can be drawn back.

Other issues described in context of other figures, but not mentioned here, also apply to the embodiment of FIGS. 10 to 12, if so appropriate.

Figure 13:
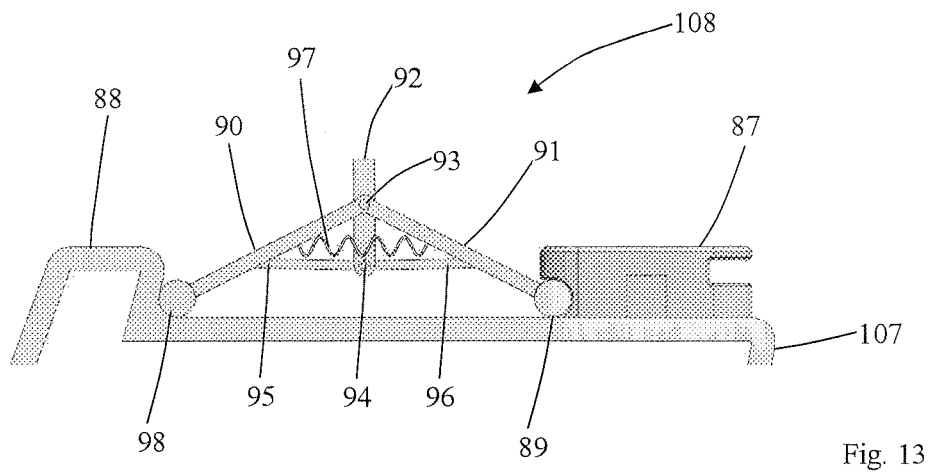
FIG. 13 schematically illustrates a mold with a fixing device in accordance with an eleventh embodiment in which the fixing device is removable and comprises a spring-loaded mechanical lock for fixing a fixating portion of a blade half to the mold.
Figure 14:
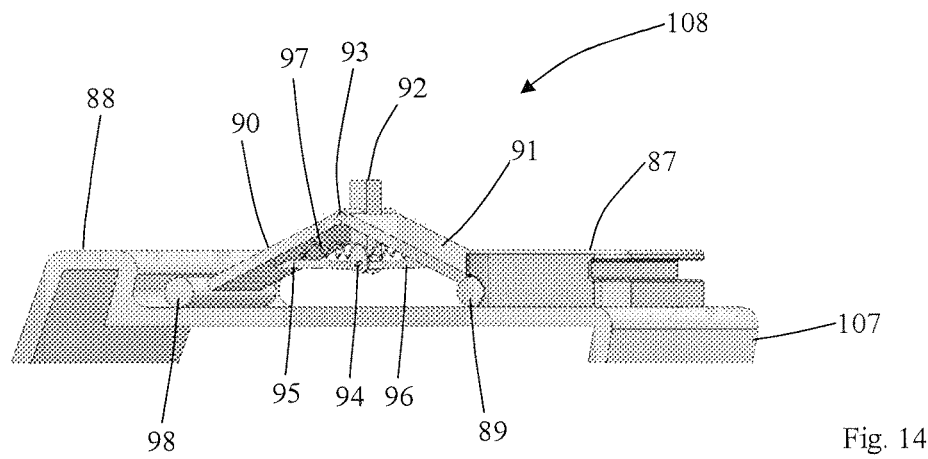
FIG. 14 shows a three-dimensional view of the mold with the fixing device illustrated in FIG. 13.

FIGS. 13 and 14 (Eleventh Embodiment)

The further embodiment of a fixing device, illustrated in FIGS. 13 and 14, is equipped with a steel-jaw trap 108 which can be clamped between a protrusion 88 of a mold 107 and spigot 87.

The steel jaw trap 108 has a clamping mechanism which is formed by two plates 90 and 91 which are interconnected by a spring 97 and by two support bars 93 and 94. An actuator rod 92 with a rectangular shape is positioned between the two plates 90 and 91 and the two support bars 93 and 94. The two plates 90 and 91 are hinged to each other at a hinge 93 in the middle of the steel jaw trap 108 such that they can swing around the rotation axis of the hinge 93.

The two support bars 95 and 96 are hinged with a hinge 94 to the actuator rod 92. The two support bars 95 and 96 force the two plates 90 and 91 outwards, when the actuator rod 92 is pulled upwards (or the plates 90 and 91 are pushed downwards). The two supports 95 and 96 are hinged to hinge 94 and are formed such that they are locked when the angle between them is basically 180°. The lock is configured to be released, when the actuator rod 92 is pushed downwards.

In the working position shown in FIGS. 13 and 14, a pressing rod 98 exerts a pressing force on protrusion 88 and on a fixating portion of a blade half (not shown) positioned between the pressing rod 98 and the protrusion 88 thereby fixating the blade half to the mold 107. A pressing rod 89 exerts a pressing force on spigot 87. Thus, the steel jaw trap is clamped between the protrusion 88 and spigot 87 and is thereby fixated to mold 107. The pressing rods 98 and 89 engage in respective rounded portions at the transition of the protrusion 88 to a flat portion of the mold 107 and at the transition of the spigot 87 to the mold 107. In the working position, the two support bars 95 and 96 have basically an angle of 180° to each other such that the steel-claim jaw 108 stays in the working position.

When the actuator rod 92 is pushed downwards the two support bars 95 and 96 are also pushed downwardly, thereby releasing the steel jaw trap 108 and, supported by spring 97, pulling the two plates 90 and 91 together, i.e., the angle between the two plates 90 and 91 decreases. Thus, the pressing force exerted by pressing rods 98 and 89 is also released and the steel jaw trap can be removed.

The dimensions of the steel jaw trap 108, especially of the two plates 90 and 91 and the actuator rod 92 are such that the actuator rod 92 is pushed down by another mold when the mold 107 is positioned upside down on top of the other mold. In this case the actuator rod 92 engages the surface of the other mold thereby releasing the steel jaw-trap 108, which can easily be removed.

In alternative embodiments, the actuator rod 92 might be adjustable in the height such that it can be adapted to a respective distance between two mold halves which are put on top of each other. Moreover, in some alternative embodiments a ratchet lock can be used for locking the steel jaw trap 108 in the working position. In such embodiments, the ratchet lock might also be adapted to hold the steel jaw trap 108 in working positions with different heights, resulting from, for example, different distances of the protrusion 88 to spigot 87 which lead to different angles between the two plates 90 and 91, when the steel jaw trap 108 is positioned between the protrusion 88 and the spigot 87 in the working position. Also in such embodiments, for example, the actuator rod 92 might be adjustable in height in order to compensate for the different heights of the steel jaw trap 108 such that, as described, another mold can push down the actuator rod 92 and thereby release the steel jaw trap 108.

Other issues described in context of other figures, but not mentioned here, also apply to the embodiment of FIGS. 13 and 14, if so appropriate.

Figure 15:
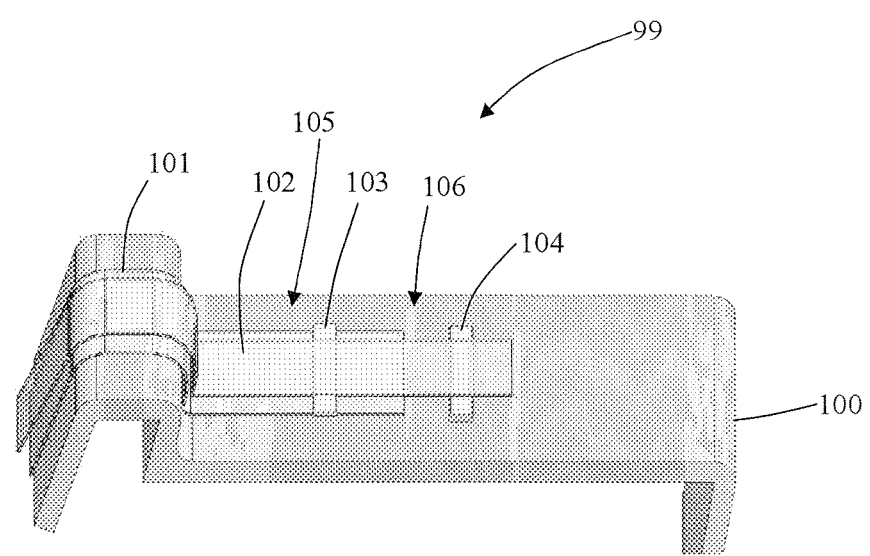
FIG. 15 schematically illustrates a mold with a fixing device in accordance with a twelfth embodiment in which the fixing device comprises two tacky tapes for fixing a part of a vacuum bag to the fixating portion of a blade half and to the mold.

FIG. 15 (Twelfth Embodiment)

Another embodiment of a fixing device 99, illustrated in FIG. 15, utilizes tacky tapes 103, 104 for fixating a fixating portion 105 of a blade half 101 and a vacuum bag 102 to a mold 100. The blade half 101 as well as the vacuum bag 102 are only shown as strips for illustration purposes.

As mentioned above, during the manufacturing of the blade half 101 the vacuum bag 102 is provided on the mold 100 after a mold material for forming the blade half 101 has been filled into the mold 100. The vacuum bag 102 covers the blade half 101 and the fixating portion 105. The vacuum bag 102 is adhered with tacky tape 104 to the substantially flat surface of the mold 100 and with tacky tape 103 to the fixating portion 105 of the blade half 101 to provide an airproof space in the vacuum bag 102. Thus, by exhausting the air from vacuum bag 102 a low-pressure is generated in the vacuum bag 102, for example, during curing of the blade half 101, with an air-pump connected to the vacuum bag 102. Thus, a pressure force, resulting from the pressure difference between the ambient air of the vacuum bag 102 which is under atmospheric pressure and the low-pressure in the vacuum bag 102, exerts a pressing force onto the vacuum bag 102 and, thus, onto the blade half 101 positioned within the vacuum bag 102, thereby fixating the blade half 101 to the mold 100.

Moreover, the vacuum bag 102 is adhered with the tacky tape to the blade half 101. After the blade shell curing, e.g., infusing curing, is completed, the vacuum bag 102 is removed such that a portion 106 of the vacuum bag 102 remains between the tacky tape 103 and the tacky tape 104 and adhered to tacky tapes 103 and 104. Between the two tacky tapes 103 and 104, the fixating portion 105 of the blade half 101 ends. Thus, the strip 106 of vacuum bag 102 remaining after the vacuum bag 102 has been removed surrounds the fixating portion 105 of the blade half 101 and, therefore, the vacuum between the blade half 101 and the mold 100 remains intact. Hence, the resulting pressure force still fixates the blade shell 101 to the mold 100 by exerting a pressing force onto the blade half, when the vacuum bag is removed.

Other issues described in context of FIGS. 1 to 14, but not mentioned here, also apply to the embodiment of FIG. 15, if so appropriate.

What is claimed is:

1. A combination of a mold and a fixing device for fixating a segment of a wind turbine blade to the mold in which the blade segment is manufactured, wherein the blade segment has a leading edge and a trailing edge that defines a chordwise direction and a fixating portion, the fixing device comprising:
   a first portion for removably fixating the blade segment at its fixating portion to the mold; and
   a second portion for fixating the fixing device to the mold, wherein the fixing device is configured to exert a pressing force on the fixating portion of the blade segment in the chordwise direction while the fixing device fixates the segment of the wind turbine blade to the mold.

2. The combination of claim 1, wherein the fixing device is at least partially inflatable.

3. The combination of claim 1, wherein the fixing device is configured to be removably fixated to the mold.

4. The combination of claim 1, wherein the fixing device comprises a spring, a gas piston, a mechanical device or an electromagnetic device, and is configured to exert a pressing force on the fixating portion of the blade segment, thereby fixating the blade segment to the mold.

5. The combination of claim 1, wherein the fixing device comprises a mechanical lock for locking the fixing device in a predefined position in which it exerts a pressing force on the fixating portion of the blade segment.

6. The combination of claim 1, further comprising a wedge part configured to be clamped between a first protrusion on the mold over which the fixating portion of the blade segment extends and a second protrusion opposite to the first protrusion, thereby fixating the fixating portion to the mold.

7. The combination of claim 1, wherein the mold comprises:
   a first portion for forming at least the segment of a wind turbine blade; and
   a second portion at least partially surrounding the first portion for forming at least one fixating portion of the blade segment.

8. The combination of claim 7, further comprising a first protrusion positioned in the second portion and at least one second protrusion, wherein the fixating portion of the blade segment extends into a region between the first and the at least one second protrusion and the first and the at least one second protrusion are configured to receive the fixing device such that the fixing device can be clamped between the first and the at least one second protrusion.

9. The combination of claim 8, wherein the at least one second protrusion comprises a groove such that the second portion of the fixing device can engage into the groove.

10. The combination of claim 7, wherein the fixing device is at least partially inflatable.

11. The combination of claim 7, wherein the fixing device is removably connected to the mold.

12. The combination of claim 7, wherein the fixing device comprises a wedge part configured to be clamped between a first protrusion on the mold over which the fixating portion of the blade segment extends and a second protrusion opposite to the first protrusion, thereby fixating the fixating portion to the mold.

13. The combination of claim 1, wherein the mold has an internal portion defined by a mold cavity and an external portion outside the mold cavity, and wherein the fixing device is fully positioned outside the mold cavity.

* * * * *